UNITED STATES PATENT OFFICE.

ERNST BUSHMAN, OF NEW YORK, N. Y.

PLASTER-BOARD AND METHOD OF MAKING SAME.

1,055,316. Specification of Letters Patent. Patented Mar. 11, 1913.

No Drawing. Application filed May 23, 1910. Serial No. 562,824.

*To all whom it may concern:*

Be it known that I, ERNST BUSHMAN, a citizen of the United States, residing at New York, in the county of Richmond and State of New York, have invented a certain new and useful Plaster-Board and Method of Making Same, of which the following is a specification.

This invention relates to improvements in plaster boards and to a process of producing the same and it has for its object to provide a plaster board which is fireproof, moisture-proof and sound proof.

Another object of the invention is to provide a plaster board of the above nature which is neither brittle nor crumbly and which may be sawed and nailed into with as much ease and to the same advantage as wood.

With the above and other objects in view, I have invented the plaster board which is compounded as follows:—First, I take ten pounds of water and add thereto twenty pounds of silicate of soda and fourteen ounces of 40% nitric acid and boil for one half hour. To five ounces of the above mixture I add one pound of a mixture composed of ten parts of sand, one part of Portland cement and three parts sawdust, shavings, shredded cornstalks, or other similar vegetable fiber. After the mass has been thoroughly mixed it is then molded and allowed to set and dry, when it is ready for use.

Boards or forms made as above may be sawed and nailed as common wood and it makes an exceedingly cheap as well as durable building material.

The nitric acid reacts with the sodium silicate, and converts it in part into sodium nitrate and hydrated silica. The latter and the remaining undecomposed silicate coat the particles of the mixture and act to produce a tough and fireproof plaster board, which shall have the desired properties. The sodium nitrate may be converted eventually into inert calcium nitrate.

My product is lighter and stronger than any plaster board now on the market, and is very tough and resilient, and has the property, in addition, of being an almost perfect non-conductor of heat. It is very light and porous yet has the property of being substantially waterproof.

I claim and desire to secure by Letters Patent:—

1. A plaster board composed of 16 parts of a mixture of 1 pound sand, 1½ pounds Portland cement and 6 pounds woody fiber, made into a plastic with 5 parts of the reaction product of 10 pounds water, 20 pounds silicate of soda and 14 ounces of nitric acid; said product being in the form of sheets having a porous appearance, and being tough, resilient, strong, non-brittle, substantially waterproof, and capable of being nailed without breaking, substantially as described.

2. A process of making plaster board which comprises treating sodium silicate solution with a relatively small amount of nitric acid alone; mixing 5 parts of the liquid thereby produced with about 16 parts of a mixture composed substantially of 1 pound of sand, 1½ pounds of Portland cement, and 6 pounds of woody fiber; pressing the plastic mass thereby produced into sheets and thereafter drying said sheets.

In testimony whereof, I have hereunto affixed my signature in the presence of two subscribing witnesses.

ERNST BUSHMAN.

Witnesses:
 RICHARD CONDON,
 H. WILLIAMSON.

Copies of this patent may be obtained for five cents each, by addressing the "Commissioner of Patents, Washington, D. C."